United States Patent
Diaz et al.

(10) Patent No.: US 9,903,274 B2
(45) Date of Patent: Feb. 27, 2018

(54) VARIABLE GEOMETRY HEAT EXCHANGER APPARATUS

(71) Applicant: General Electric Company, Schenectady, NY (US)

(72) Inventors: Carlos Enrique Diaz, Garching bei Munchen (DE); William Dwight Gerstler, Niskayuna, NY (US); Michael Ralph Storage, Beavercreek, OH (US); Michael Thomas Kenworthy, Beavercreek, OH (US)

(73) Assignee: General Electric Company, Niskayuna, NY (US)

( * ) Notice: Subject to any disclaimer, the term of this patent is extended or adjusted under 35 U.S.C. 154(b) by 222 days.

(21) Appl. No.: 14/535,614

(22) Filed: Nov. 7, 2014

(65) Prior Publication Data

US 2016/0131035 A1  May 12, 2016

(51) Int. Cl.
*F02C 1/00* (2006.01)
*F02C 7/14* (2006.01)
(Continued)

(52) U.S. Cl.
CPC ............... *F02C 7/14* (2013.01); *B64D 33/12* (2013.01); *F02C 7/18* (2013.01); *F02K 3/025* (2013.01);
(Continued)

(58) Field of Classification Search
CPC ...... F28F 13/00; F28F 2013/008; F28F 13/02; F28F 13/08; F28F 13/14; F28F 2255/04;
(Continued)

(56) References Cited

U.S. PATENT DOCUMENTS

| 3,837,395 A | 9/1974 | Coolidge |
| 8,291,710 B2 | 10/2012 | Webster |

(Continued)

FOREIGN PATENT DOCUMENTS

| EP | 2469214 A2 | 6/2012 |
| EP | 2894323 A1 | 7/2015 |

(Continued)

OTHER PUBLICATIONS

European Search Report and Opinion issued in connection with corresponding EP Application No. 15193465.0 dated Apr. 22, 2016.
(Continued)

*Primary Examiner* — Pascal M Bui Pho
*Assistant Examiner* — Edwin Kang
(74) *Attorney, Agent, or Firm* — Nitin N. Joshi

(57) ABSTRACT

A heat exchanger apparatus including a surface cooler and a passive automatic retraction and extension system coupled to the surface cooler. The surface cooler having disposed therein one or more fluid flow channels configured for the passage therethrough of a heat transfer fluid to be cooled. The heat transfer fluid in a heat transfer relation on an interior side of said one or more fluid flow channels. The surface cooler including a plurality of fins projecting from an outer surface thereof. The passive automatic retraction and extension system including a thermal actuation component responsive to a change in temperature of at least one of the heat transfer fluid and a cooling fluid flow so as to actuate a change in a geometry of the surface cooler. Further disclosed is an engine including the heat exchanger apparatus.

16 Claims, 9 Drawing Sheets

(51) Int. Cl.
  *B64D 33/12* (2006.01)
  *F02C 7/18* (2006.01)
  *F28F 27/02* (2006.01)
  *F28D 1/047* (2006.01)
  *F28D 7/08* (2006.01)
  *F02K 3/02* (2006.01)
  *F28F 13/00* (2006.01)
  *F02K 3/06* (2006.01)
  *F28F 1/12* (2006.01)
  *F28D 21/00* (2006.01)

(52) U.S. Cl.
  CPC ............ *F02K 3/06* (2013.01); *F28D 1/047* (2013.01); *F28D 7/08* (2013.01); *F28F 13/00* (2013.01); *F28F 27/02* (2013.01); *F05D 2250/90* (2013.01); *F05D 2300/505* (2013.01); *F28D 2021/0021* (2013.01); *F28D 2021/0026* (2013.01); *F28F 1/12* (2013.01); *F28F 2255/04* (2013.01); *F28F 2280/10* (2013.01); *Y02T 50/675* (2013.01)

(58) Field of Classification Search
  CPC ..... F28D 2021/0021; F28D 2021/0026; F05D 2260/213; F05D 2300/505; F02K 3/075; F02K 3/025; F01D 25/12; F01D 17/105; F02C 7/14; F02C 7/18
  See application file for complete search history.

(56) References Cited

U.S. PATENT DOCUMENTS

| | | | |
|---|---|---|---|
| 8,333,552 B2 | 12/2012 | Wood et al. | |
| 8,434,293 B2 | 5/2013 | Widdle, Jr. et al. | |
| 8,490,382 B2 | 7/2013 | Zysman et al. | |
| 8,601,792 B2 | 12/2013 | Mylemans | |
| 8,770,269 B2 | 7/2014 | Scott | |
| 9,316,152 B2 | 4/2016 | Subbareddyar et al. | |
| 2006/0191267 A1* | 8/2006 | Song | F02K 1/06 60/771 |
| 2007/0169928 A1 | 7/2007 | Dayan et al. | |
| 2008/0095611 A1 | 4/2008 | Storage et al. | |
| 2009/0223648 A1* | 9/2009 | Martin | F28F 1/40 165/86 |
| 2010/0155016 A1 | 6/2010 | Wood et al. | |
| 2011/0030337 A1 | 2/2011 | Mons | |
| 2012/0168115 A1 | 7/2012 | Raimarckers et al. | |
| 2012/0237322 A1 | 9/2012 | Toline et al. | |
| 2012/0237332 A1 | 9/2012 | Bulin et al. | |
| 2013/0011246 A1 | 1/2013 | Todorovic | |
| 2014/0044525 A1 | 2/2014 | Storage et al. | |
| 2014/0145008 A1 | 5/2014 | Webster | |

FOREIGN PATENT DOCUMENTS

| | | |
|---|---|---|
| JP | S6312079 A | 1/1988 |
| JP | H01263491 A | 10/1989 |
| JP | 2013256949 A | 12/2013 |
| JP | 2014034975 A | 2/2014 |

OTHER PUBLICATIONS

Stoeckel et al., "Actuation and Fastening With Shape Memory Alloys in the Automotive Industry", Metal Science and Engineering, Jul. 1992, vol. 46, Issue 7, pp. 668-672, 1992; republished SAE, Apr. 1, 1996.

Unofficial English Translation of Japanese Search Report issued in connection with corresponding JP Application No. 2015217183 dated Oct. 28, 2016.

Unofficial English Translation of Japanese Office Action issued in connection with corresponding JP Application No. 2015217183 dated Nov. 1, 2016.

* cited by examiner

VARIABLE GEOMETRY HEAT EXCHANGER APPARATUS

BACKGROUND

This invention relates generally to heat exchanger apparatus in gas turbine engines, and more particularly to a variable geometry surface cooler in such gas turbine engines.

Aviation engines use heat transfer fluids, such as oil or fuel, to dissipate heat from engine components, such as engine bearings, electrical generators, and the like. Heat is typically rejected from the fluid to air by heat exchanger assemblies, such as fuel cooled oil coolers or air cooled surface oil coolers, to maintain oil temperatures at a desired ~100° F.<T<300° F. In many instances, known heat exchanger assemblies, and more particularly surface coolers, typically found in aircraft engines are sized for ground idle (GI) conditions, when the temperature of the surrounding air is higher and the air speed is lower than during other phases of flight, such as found during inflight conditions. In addition, these known surface coolers are designed for use during top of climb conditions. Both ground idle conditions and top of climb conditions require a heat transfer area in the heat exchanger that is greater than during other phases of flight, such as found during inflight conditions. As such these known heat exchanger assemblies are designed for maximum heat exchange performance. For cruise conditions, such as during inflight, when the temperature of the surrounding air is lower and the air speed is higher than during other phases of flight, these surface coolers are typically overdesigned and add additional drag to the propulsion system, therefore increasing the engine specific fuel consumption (SFC). In addition, heat transfer fluids may be used to dissipate heat from generators within the aviation engine that produce electricity. In these instances, fluid cooling may be desired during any envelope of flight (cruise, ground idle, top of climb, etc.) and based on load and heat exchange requirements.

It would therefore be desirable to provide a robust method and apparatus for maintaining sufficient cooling to a heat transfer fluid, such as oil, passing through a heat exchanger apparatus during high temperature conditions for an aviation engine, yet without adding additional drag to the propulsion system during low temperature conditions. It is also desirable to provide a robust method and apparatus for maintaining sufficient cooling to a heat transfer fluid, such as oil, passing through a heat exchanger apparatus during increased load conditions. A heat exchanger apparatus that addresses the above issues is desired.

BRIEF SUMMARY

These and other shortcomings of the prior art are addressed by the present disclosure, which provides a heat exchanger apparatus, and more particularly a variable geometry surface cooler.

In accordance with embodiment, provided is a heat exchanger apparatus. The heat exchanger apparatus including a surface cooler and a passive automatic retraction and extension system. The surface cooler having disposed therein one or more fluid flow channels configured for the passage therethrough of a heat transfer fluid to be cooled. The heat transfer fluid is in a heat transfer relation on an interior side of said one or more fluid flow channels. The surface cooler further including a plurality of fins projecting from an outer surface thereof. The passive automatic retraction and extension system is coupled to the surface cooler. The passive automatic retraction and extension system including a thermal actuation component. The thermal actuation component is responsive to a change in temperature of at least one of the heat transfer fluid and a cooling fluid flow so as to actuate a change in a geometry of the surface cooler.

In accordance with another embodiment, provided is heat exchanger apparatus for use in an oil cooling system of an aircraft engine. The heat exchanger apparatus including a surface cooler including a manifold portion, one or more flow through channels, a plurality of cooling fins and a passive automatic retraction and extension system. The manifold portion including a radially inner surface and a radially outer surface, an upstream wall and an opposite downstream wall. The one or more flow through channels are in fluid communication with the manifold portion and extending therethrough. The one or more flow through channels having contained therein a heat transfer fluid. The plurality of cooling fins are formed unitarily with the manifold portion, projecting from an outer surface thereof and positioned substantially perpendicular to the one or more flow through channels. The passive automatic retraction and extension system is coupled to the surface cooler. The passive automatic retraction and extension system including a thermal actuation component responsive to a change in temperature of at least one of the heat transfer fluid and a cooling fluid flow so as to provide passive, automatic retraction of the plurality of fins away from the cooling fluid flow during a first state of operation and passive, automatic extension of the plurality of fins into the cooling fluid flow during a second state of operation.

In accordance with another embodiment, provided is an engine. The engine includes a fan assembly, a core engine downstream of the fan assembly, a fan casing substantially circumscribing the fan assembly, a booster casing substantially circumscribing the core engine such that a bypass duct is defined between the fan casing and the booster casing and an arcuate heat exchanger apparatus coupled to one of the fan casing or the booster casing. The arcuate heat exchanger including a surface cooler and a passive automatic retraction and extension system. The surface cooler having disposed therein one or more fluid flow channels configured for the passage therethrough of a heat transfer fluid to be cooled. The heat transfer fluid is in a heat transfer relation on an inner side of said one or more fluid flow channels. The surface cooler including a plurality of fins projecting from an outer surface thereof. The passive automatic retraction and extension system is coupled to the surface cooler. The passive automatic retraction and extension system including a thermal actuation component responsive to a change in temperature of at least one of the heat transfer fluid and a cooling fluid flow to provide passive, automatic retraction of the plurality of fins away from the cooling fluid flow during a first state of operation and passive, automatic extension of the plurality of fins into the cooling fluid flow during a second state of operation.

Other objects and advantages of the present disclosure will become apparent upon reading the following detailed description and the appended claims with reference to the accompanying drawings.

BRIEF DESCRIPTION OF THE FIGURES

These and other features, aspects, and advantages of the present disclosure will become better understood when the following detailed description is read with reference to the accompanying drawings in which like characters represent like parts throughout the drawings, wherein.

Corresponding reference characters indicate corresponding parts throughout the several views of the drawings.

DETAILED DESCRIPTION

The present disclosure will be described for the purposes of illustration only in connection with certain embodiments; however, it is to be understood that other objects and advantages of the present disclosure will be made apparent by the following description of the drawings according to the disclosure. While preferred embodiments are disclosed, they are not intended to be limiting. Rather, the general principles set forth herein are considered to be merely illustrative of the scope of the present disclosure and it is to be further understood that numerous changes may be made without straying from the scope of the present disclosure.

Preferred embodiments of the present disclosure are illustrated in the figures with like numerals being used to refer to like and corresponding parts of the various drawings. It is also understood that terms such as "top", "bottom", "outward", "inward", and the like are words of convenience and are not to be construed as limiting terms. It is to be noted that the terms "first," "second," and the like, as used herein do not denote any order, quantity, or importance, but rather are used to distinguish one element from another. The terms "a" and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity).

Embodiments disclosed herein relate to a variable geometry heat exchanger apparatus including a passive automatic retraction and extension of a plurality of cooling fins. The passive automatic retraction and extension (actuation function) of the fins is responsive to a temperature (sensing function) of one or more fluid flow channels disposed in the heat exchanger apparatus, which is driven by a temperature of a cooling fluid flowing through the fluid flow channels and/or a temperature of an fluid flow, such as an fluid flow, impinging thereon the heat exchanger apparatus. The variable geometry heat exchanger apparatus as disclosed herein is configured to weigh and cost less than known means that are overdesigned and add extra drag to the propulsion system, therefore increasing the engine specific fuel consumption. In addition, the disclosed novel heat exchanger apparatus minimizes the weight and cost of the overall heat exchanger apparatus. Accordingly, disclosed is varying of the geometry of the heat exchange apparatus through the passive automatic retraction and extension of the plurality of cooling fins in response to a temperature of the fluid flow channels in the heat exchanger apparatus, such as an air or fuel cooled surface cooler, for an aviation engine.

Figure 1:
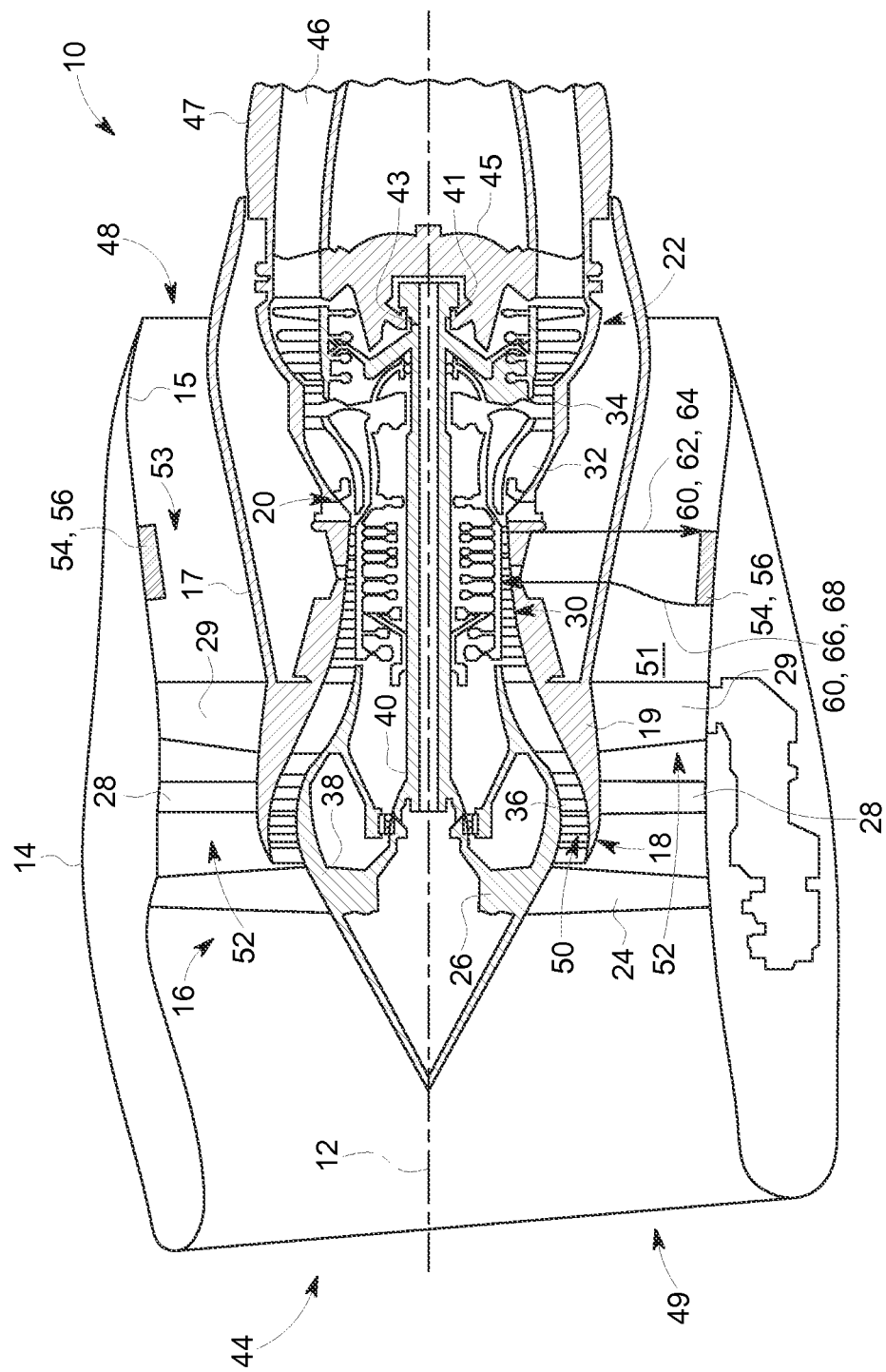
FIG. 1 is a schematic longitudinal cross-section of portion of an aircraft engine including a variable geometry heat exchanger apparatus, in accordance with one or more embodiments shown or described herein.
Figure 2:
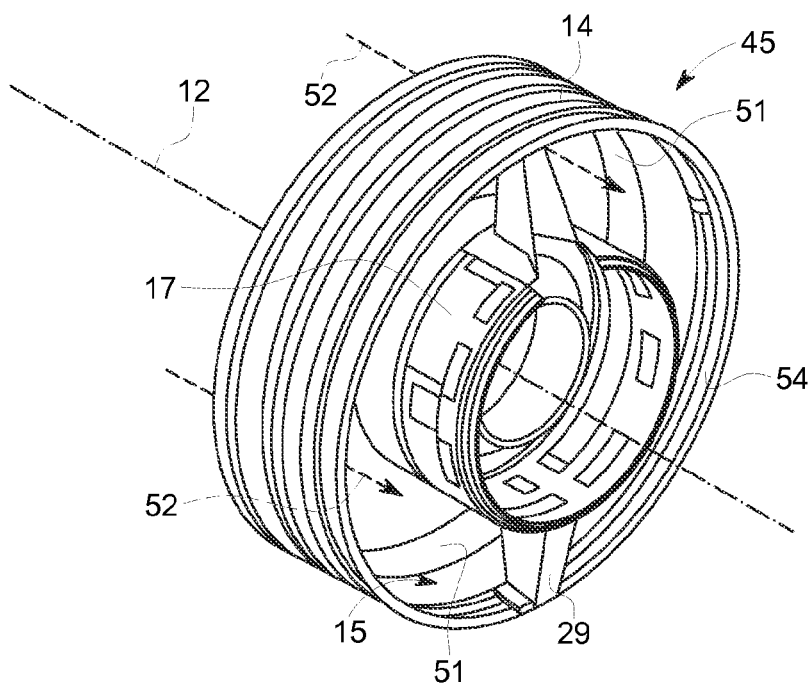
FIG. 2 is a schematic isometric view of an embodiment of a fan frame of FIG. 1, including a variable geometry heat exchanger apparatus, in accordance with one or more embodiments shown or described herein.

Referring to the drawings wherein identical reference numerals denote the same elements throughout the various views, FIGS. 1 and 2 depict schematic illustrations of an exemplary aircraft engine assembly 10. The engine assembly 10 has a longitudinal center line or axis 12 and an outer stationary annular fan casing 14 disposed concentrically about and coaxially along the axis 12. In the exemplary embodiment, the engine assembly 10 includes a fan assembly 16, a booster compressor 18, a core gas turbine engine 20, and a low-pressure turbine 22 that may be coupled to the fan assembly 16 and the booster compressor 18. The fan assembly 16 includes a plurality of rotor fan blades 24 that extend substantially radially outward from a fan rotor disk 26, as well as a plurality of structural strut members 28 and outlet guide vanes ("OGVs") 29 that may be positioned downstream of the rotor fan blades 24. In this example, separate members are provided for the aerodynamic and structural functions. In other configurations, each of the OGVs 29 may be both an aerodynamic element and a structural support for an annular fan casing (described presently).

The core gas turbine engine 20 includes a high-pressure compressor 30, a combustor 32, and a high-pressure turbine 34. The booster compressor 18 includes a plurality of rotor blades 36 that extend substantially radially outward from a compressor rotor disk 38 coupled to a first drive shaft 40. The high-pressure compressor 30 and the high-pressure turbine 34 are coupled together by a second drive shaft 41. The first and second drive shafts 40 and 41 are rotatably mounted in bearings 43 which are themselves mounted in a fan frame 45 and a turbine rear frame 47. The engine assembly 10 also includes an intake side 44, defining a fan intake 49, a core engine exhaust side 46, and a fan exhaust side 48.

During operation, the fan assembly 16 compresses air entering the engine assembly 10 through the intake side 44. The fluid flow exiting the fan assembly 16 is split such that a portion 50 of the fluid flow is channeled into the booster compressor 18, as compressed fluid flow, and a remaining portion 52 of the fluid flow bypasses the booster compressor 18 and the core gas turbine engine 20 and exits the engine assembly 10 via a bypass duct 51, through the fan exhaust side 48 as bypass air. More specifically, the bypass duct 51 extends between an interior wall 15 of the fan casing 14 and an outer wall 17 of a booster casing 19. This portion 52 of the fluid flow, also referred to herein as the cooling fluid flow 52, flows past and interacts with the structural strut members 28, the outlet guide vanes 29 and a heat exchanger apparatus 54. The plurality of rotor blades 24 compress and deliver the compressed fluid flow 50 towards the core gas turbine engine 20. Furthermore, the fluid flow 50 is further compressed by the high-pressure compressor 30 and is delivered to the combustor 32. Moreover, the compressed fluid flow 50 from the combustor 32 drives the rotating high-pressure turbine 34 and the low-pressure turbine 22 and exits the engine assembly 10 through the core engine exhaust side 46.

As previously noted, in certain presently available commercial engines heat exchanger apparatus are employed, such as an air-cooled oil cooler (ACOC) or a fuel-cooled oil cooler. In accordance with exemplary aspects of the present technique, a novel variable geometry heat exchanger apparatus 54 is presented for use in an oil cooling system 53 of the aircraft engine assembly 10. More particularly, the exemplary heat exchanger apparatus 54 may be configured to include a surface cooler 56 and a passive automatic retraction and extension system (described presently) that provides passive automatic retraction and extension of a plurality of cooling fins (described presently) relative to the cooling fluid flow 52 in response to a temperature of one or more oil channels in the surface cooler 56. The passive actuation is driven by the oil temperature and air temperature, for example. Hereinafter, the term "heat exchanger apparatus" may be used to refer to the variable geometry heat exchanger apparatus 54, including the surface cooler 56 and the passive automatic retraction and extension system, configured to facilitate cooling of the turbomachine. Furthermore, in an embodiment, the surface cooler 56 may be configured as an air-cooled oil cooler (ACOC), a fuel-cooled oil cooler (FCOC), or any other heat exchanger using a heat transfer fluid or the like. The concept disclosed herein is also applicable to any type of aircraft engine (e.g. piston, electric, etc.) including a heat exchanger apparatus.

Referring more specifically to FIG. 2, illustrated is a schematic longitudinal cross-section of portion of the aircraft engine of FIG. 1, including the heat exchanger apparatus 54, including a passive automatic retraction and extension system for automated retraction and extension of a plurality of cooling fins (described presently). As illustrated, in the embodiment of FIGS. 1 and 2, the heat exchanger apparatus 54 may be mounted to the inner wall 15 of the fan casing 14 and within the volume that defines the bypass duct 51 downstream of the OGVs 29. In alternate embodiments, the heat exchanger apparatus 54 may be may be mounted to the inner wall 15 of the fan casing 14, upstream of the strut members 28.

During operation, a portion of the bypass fluid flow, referred to herein as cooling fluid flow 52, flows past and interacts with the heat exchanger apparatus 54 as a cooling fluid flow. As best illustrated in FIG. 1, during operation, a heat transfer fluid 60 flows through the heat exchanger apparatus 54 where it is cooled. It should be understood that the term "heat transfer fluid" as used throughout this disclosure is intended to encompass all types of fluids that may be utilized for the transfer of heat from one fluid to another, such as, but not limited to, air, oil, water, lubricating fluids, dielectric fluids, fuels, liquid metals, or the like. In this particular embodiment, the heat transfer fluid 60 is a lubricating fluid, such as engine oil. During operation, the heat transfer fluid 60 is directed to the heat exchanger apparatus 54 via a first passage 64 as a hot fluid 62. A cooled fluid 66, and in this particular embodiment cooled engine oil, is directed back to the engine 10 via a second passage 68. In an embodiment, the first passage 64 may be connected on one side to a fluid outlet of an engine block, or the like, and on the other side to a fluid inlet of the heat exchanger 54. In addition, the second passage 68 is connected on one side to a fluid outlet of the heat exchanger apparatus 54 and on the other side to a fluid inlet of the engine 10, or the like. In an alternate embodiment, the cooling system includes a heat transfer fluid supply source (not shown) and one or more pumps which circulate the heat transfer fluid 60 to one or more bearings and to a gearbox and return the hot fluid 62 to the heat transfer fluid supply source via the heat exchanger apparatus 54 which cools it to a lower temperature.

As previously indicated in the illustrated embodiments, during normal operating conditions, heat is rejected from the hot fluid 62 to air (or alternatively another surrounding fluid) by the heat exchanger apparatus 54 to maintain fluid temperatures at a desired ~100° F.<T<300° F. As previously indicated, in a typical heat exchanger apparatus of an aircraft engine, the surface cooler is overdesigned and adds extra drag to the propulsion system that increases the engine specific fuel consumption. Accordingly, the novel heat exchanger apparatus 54, and more particularly the surface cooler 56 disclosed herein, includes passive automatic retraction and extension of a plurality of cooling fins (described presently) in response to a temperature of one or more of the fluid flow channels 58 in the surface cooler 56.

In an exemplary embodiment, the heat exchanger apparatus 54 is a conformal air-cooled heat exchanger that is positioned within the bypass duct 51. Optionally, the heat exchanger apparatus 54 may be utilized in a wide variety of applications on or off the engine. More specifically, although in one embodiment the heat exchanger apparatus 54 may be described as configured to cool a lubricating fluid for engine bearings, it may alternatively or simultaneously cool other fluids. For example, it may cool a fluid used to extract heat from generators or actuators used on the engine. It may also be used to cool fluids which extract heat from electronic apparatus such as engine controls. In addition to cooling a wide variety of fluids utilized by a gas turbine engine assembly, it should be realized that the heat exchanger apparatus 54, and the methods described herein illustrate that the heat exchanger apparatus 54 may also cool an apparatus that is mounted on the airframe, and not part of the engine. In other applications, the heat exchanger apparatus 54 may be mounted remotely from the gas turbine engine, for example on an external surface of the aircraft. Moreover, the heat exchanger apparatus 54 may be utilized in a wide variety of other applications to either cool or heat various fluids channeled therethrough, such as in any type of moving craft that generates heat and where aerodynamic drag is a penalty. As such, the heat exchanger apparatus 54 may be utilized in an automobile, a truck, a locomotive, a hovercraft, or the like. In addition, it is anticipated that the heat exchanger apparatus 54 may be utilized in any type of watercraft, such as ships or submarines, where the environment might be water instead of air and reducing drag remains of interest.

Figure 3:
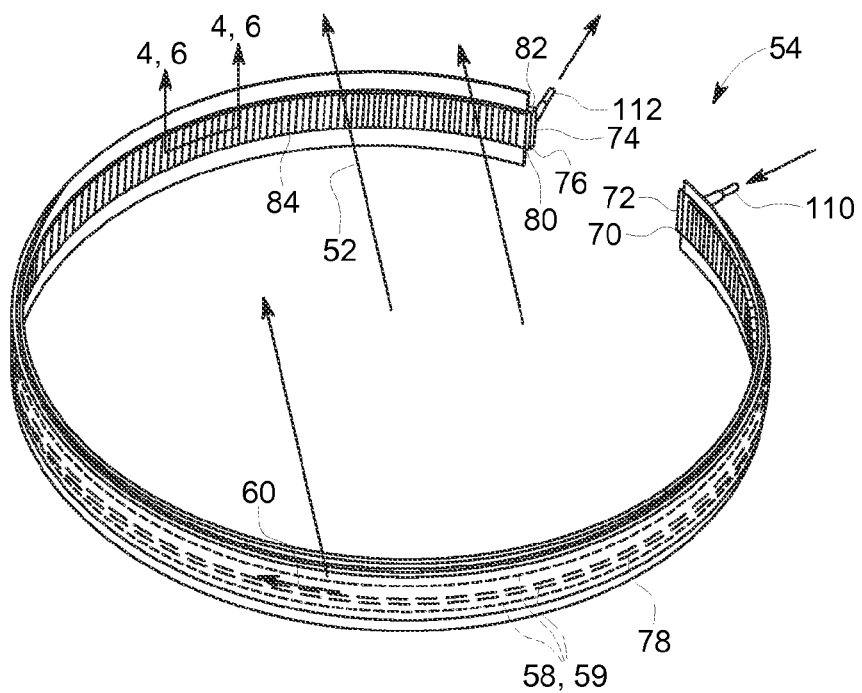
FIG. 3 is a perspective view of an exemplary arcuate variable geometry heat exchanger apparatus that may be utilized with the gas turbine engine and fan frame shown in FIGS. 1 and 2, in accordance with one or more embodiments shown or described herein.

Referring now to FIG. 3, illustrated is a perspective view of the heat exchanger apparatus 54 of FIGS. 1 and 2, and more particularly the surface cooler 56 including a plurality of fluid flow channels 58 passing therethrough and shown in hidden line. In the exemplary embodiment, during assembly, the heat exchanger apparatus 54 is bent such that the heat exchanger apparatus 54 has a circumferential and axial profile that is substantially similar to the circumferential and axial profile of at least a portion of the bypass duct 51. More specifically, the heat exchanger apparatus 54 is bent such that is has a circumferential and axial profile that is conforming to the circumferential and axial profile of the surface of the bypass duct 51 at the location where it is mounted as shown in FIGS. 1 and 2. As such, the heat exchanger apparatus 54 has a substantially arcuate shape. As illustrated in FIGS. 1 and 2, the heat exchanger apparatus 54 may be placed proximate to the inner wall 15 of the fan casing 14 and within the bypass duct 51. Moreover, the heat exchanger 54 may also be bent such that is has a circumferential and axial profile that is substantially similar to the circumferential and axial profile of the surface to which it is mounted.

As shown in FIG. 3, the heat exchanger apparatus 54 covers substantially all (about 320°) of the circumference of the fan casing 14. Alternatively, the heat exchanger may be formed by several segments, which are mounted end-to-end to cover the same circumferential length. The heat exchanger apparatus 54, and more particularly the surface cooler 56 includes a manifold portion 70 having a first end 72 and an opposite second end 74. The manifold portion 70 also includes a radially inner surface 76, a radially outer surface 78, an upstream wall 80, and an opposite downstream wall 82 such that the manifold portion 70 has a substantially rectangular cross-sectional profile. The manifold portion 70 also includes a plurality of cooling fins 84 extending radially inward from the radially inner surface 76 so as to project from the radially inner surface 76 of the surface cooler 56. Optionally, depending on placement of the heat exchanger 54, the cooling fins 84 may extend either radially inward as shown in FIG. 3, or may extend radially outward, or may include fins that extend both radially inward and radially outward from the manifold portion 70.

The manifold portion 70 also encloses the at least one fluid channel 58 extending lengthwise therethrough that is selectively sized to receive the heat transfer fluid 60 to be cooled therethrough and wherein the heat transfer fluid 60 is disposed in a heat transfer relation on an interior side of the at least one fluid channel 58. In the illustrated exemplary embodiment, the manifold portion 70 includes a plurality of fluid flow channels 58 extending therethrough. It should be understood that, in an embodiment the number of fluid flow channels 58 in the heat exchanger apparatus 54 is based on the degree of heat exchange required to achieve the cooling reduction desired. The plurality of fluid flow channels 58 form parallel flow through channels, each defining a channel opening (not shown) and a channel body 59, extending circumferentially about the heat exchanger apparatus 54 that may all carry the same fluid, or they may be segregated into multiple groups where each group carries a different cooling fluid used for different cooling purposes. For example, one group may carry lubrication fluid for the bearings, and another group might carry a separate cooling fluid for electronic apparatus on the engine. In addition, the fluid flow channels 58 may be configured to carry additional fluids such as decongealing materials or the like.

In the exemplary embodiment, the cooling fins 84 extend along the width of the manifold portion 70 between the lateral (upstream and downstream) edges of the manifold portion 70 and are spaced around the heat exchanger 54. As installed in the turbine engine 10 (FIG. 1), the fins 84 extend axially along centerline axis 12 in parallel with the fluid flow direction 52 and are arranged radially around an inside or outside surface of gas turbine engine 10. In the exemplary embodiment, the cooling fins 84 are coupled to manifold portion 70 such that each of the cooling fins 84 is substantially perpendicular to the plurality of fluid flow channels 58 and such that the direction of the fluid channeled through the plurality of fluid flow channels 58 is approximately perpendicular to the direction of the fluid flow 52 channeled through the cooling fins 84. More specifically, the cooling fins 84 are aligned substantially parallel with centerline axis 12 such that the fluid flow (or cooling fluid flow) channeled into or around the fan intake 49 is first channeled through a plurality of openings or air channels (described presently) defined between adjacent cooling fins 84. In an embodiment each cooling fin 84 may include a plurality of cooling fin segments or formed as a unitary cooling fin, i.e. does not include segments, without affecting the scope of the disclosure.

Figure 4:
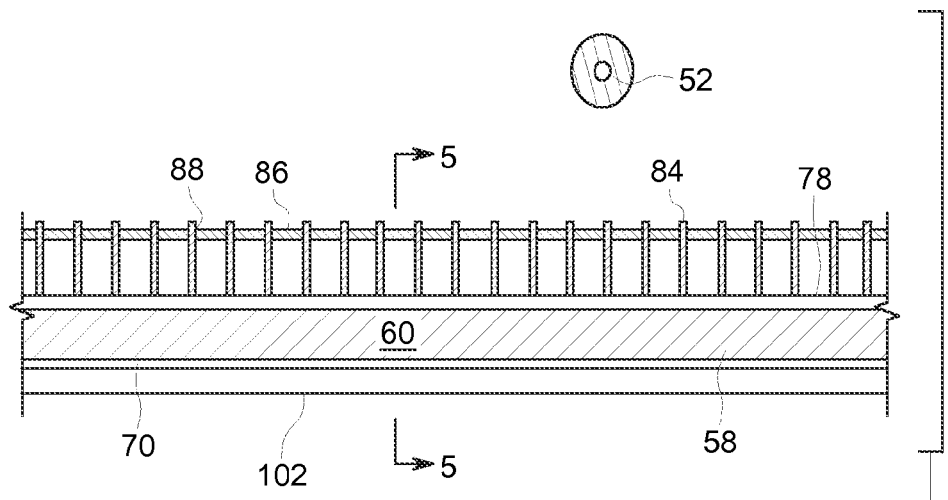
FIG. 4 is a partial cross-sectional view of an embodiment of the variable geometry heat exchanger apparatus shown in FIG. 3, taken through line 4-4, during a first state of operation, in accordance with one or more embodiments shown or described herein.
Figure 5:
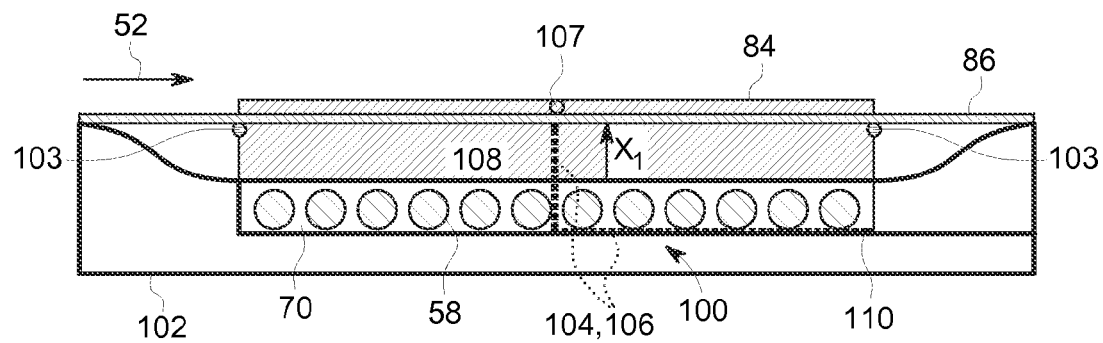
FIG. 5 is a cross-sectional view of the variable geometry heat exchanger apparatus shown in FIG. 4, taken through line 5-5, during the first state of operation, in accordance with one or more embodiments shown or described herein.
Figure 6:
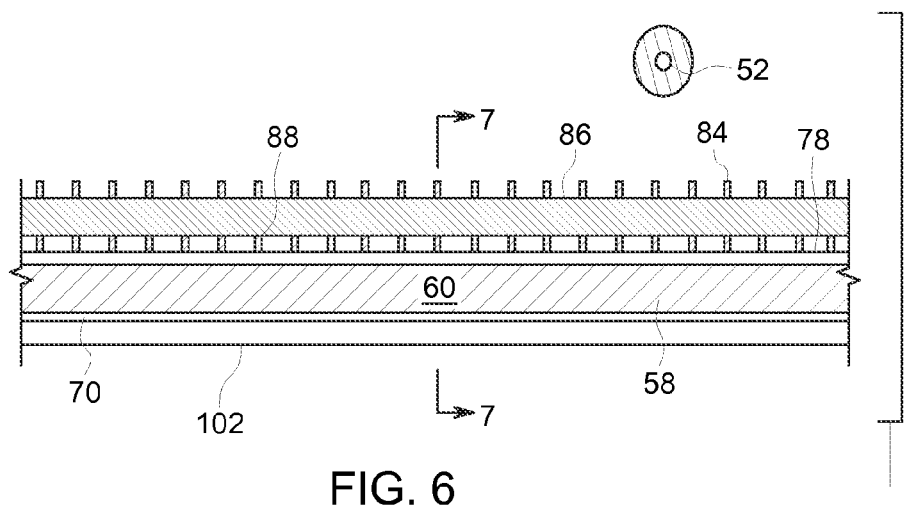
FIG. 6 is a partial cross-sectional view of the variable geometry heat exchanger apparatus shown in FIG. 3, taken through line 6-6, during a second state of operation, in accordance with one or more embodiments shown or described herein.
Figure 7:
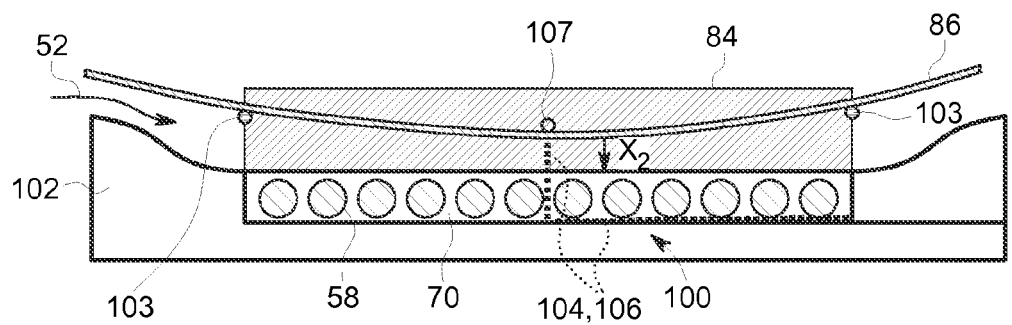
FIG. 7 is a cross-sectional view of the variable geometry heat exchanger apparatus shown in FIG. 6, taken through line 7-7, during the second state of operation, in accordance with one or more embodiments shown or described herein.

Referring now to FIGS. 4-7, illustrated is a first embodiment of a passive automatic retraction and extension system 100 incorporated into the heat exchanger apparatus 54 of FIGS. 1-3. Illustrated in FIGS. 4 and 5 are partial cross-sectional views of the heat exchanger apparatus 54 during a first state of operation, such as in an engine oil system during a cruise condition of flight or such as in an engine generator system during a minimal load condition or condition in which minimal heat exchange is required. FIG. 4 is taken through line 4-4 of FIG. 3 and FIG. 5 taken through line 5-5 of FIG. 4. FIGS. 6 and 7 are partial cross-sectional views of the heat exchanger apparatus 54 during a second state of operation, such as in an engine oil system during a ground idle or climb condition of flight or such as in an engine generator system during a high load condition or condition in which an increase in heat exchange is required. FIG. 6 is taken through line 6-6 of FIG. 3 and FIG. 7 taken through line 7-7 of FIG. 6.

Referring more specifically to FIGS. 4 and 5, illustrated is the heat exchanger apparatus 54, including the surface cooler 56 and the passive automatic retraction and extension system 100 during a first state of operation in which the plurality of fins 84 are positioned in a retracted state, such as when a lesser degree of heat exchange is required, as previously described. In the illustrated embodiment, the passive actuation system 100 includes a plate 86 having a plurality of opening 88 defined therein. The plate 86 and openings 88 are configured to provide for the passage therethrough of the plurality of fins 84 during extension of the fins 84, as best illustrated in FIGS. 6 and 7 during the second state of operation. In an embodiment, plate 86 is formed of a metal material having the plurality of opening 88 configured as slots. Each of the plurality of fins 84 is positioned to cooperate and extend through a single opening or slot 88. Additionally, illustrated is the plurality of fluid flow channels 58 having a lubricating fluid, such as the heat transfer fluid 60, passing therethrough. In an embodiment, the plate 86 is supported by a housing 102 and a plurality of support components 103. The surface cooler 56 is disposed within the housing 102, such as a portion of the fan casing 14 or the like.

In the embodiment disclosed in FIGS. 4-7, the passive automatic retraction and extension system 100 provides extension and retraction of the plurality of fins 84 in response to a temperature of the fluid flow channels 58, and more particularly in response to a temperature of the heat transfer fluid 60 flowing therethrough. In the embodiment of FIGS. 4-7 the passive automatic retraction and extension system 100 is comprised of a thermal actuation component 104 coupled to the plate 86. In the illustrated embodiment, the thermal actuation component 104 is a wire 106, but anticipated is any type of suitably configured thermal activated actuator, such as a strap, band, spring, fastener, or the like. In an embodiment, the thermal actuation component 104, and more particularly the wire 106, is comprised of a shape memory alloy (SMA) material and thus passively actuated in response to a change in thermal conditions. Accordingly, the wire 106 is described as having dual functions, and more particularly it measures the temperature (sensing function) and it actuates (or moves) the plate 86 (actuation function).

In the illustrated embodiment, the wire 106 is coupled at a first end 108 to the plate 86 and a support component 107 and at a second end 110 to the housing 102, or other stable component. During passive actuation, the wire 106 in response to temperature changes of the cooling fluid flow 52 and/or the heat transfer fluid 60, lengthens or shortens, thereby moving the plate 86 closer to or further from the housing 100 and exposing more or less of the plurality of fins 84.

Shape memory alloys (SMAs) are based on a change of mechanical properties of a material during the reversible transformation of two allotropic phases (e.g. martensite phase to austenite phase in a NiTi alloy). Shape memory alloys have been used in the automotive industry, but have not been disclosed for use in a main oil cooling or electrical generator cooling oil systems. In addition, it is not known to use shape memory alloys in cooling oil systems in aviation engines, such as aircraft engine assembly 10 described herein. Shape memory alloys (SMAs) provide for restoration of an original shape of deformed material by heat. Accordingly, during the first state of operation as best illustrated in FIGS. 4 and 5, such as when a lesser degree of heat exchange is required, the SMA wire 106 provides passive, automatic retraction of the plurality of fins 84 from the cooling fluid flow 52 allowing sufficient cooling capability, but at the same time decreasing the aerodynamic drag of the apparatus 54. During a second state of operation, such as when an increase in heat exchange is required, the SMA wire 106 provides for retracting of the plate 86 toward the housing 102 to provide for the plurality of fins 84 to achieve a deployed or extended position and thereby maximizing the heat transfer capability of the heat exchanger apparatus 54.

As previously indicated, the wire 106 is comprised of a SMA material that when under the influence of cold conditions will lengthen thereby permitting the plate 86 to move in a direction "$x_1$" away from the plurality of fluid flow channels 58 and manifold 70. This lengthening of the wire 106 and movement of plate 86 provides for retraction of the plurality of fins 84 via the slots 88 so as to decrease aerodynamic drag of the plurality of fins 84. When the wire 106 is under the influence of a hot condition, and more particularly when the fluid 60 within the channels 58 is hot so as to require cooling, the SMA wire 106 returns to its original memorized shortened state, thereby permitting the plate 86 to move in a direction "$x_2$" closer to the plurality of fluid flow channels 58 and manifold 70, as best illustrated in FIGS. 6 and 7. This return of the wire 106 to it shortened memorized state provide for extension of the plurality of fins 84 via the slots 88 so as to increase the cooling capability of the plurality of fins 84.

Figure 8:
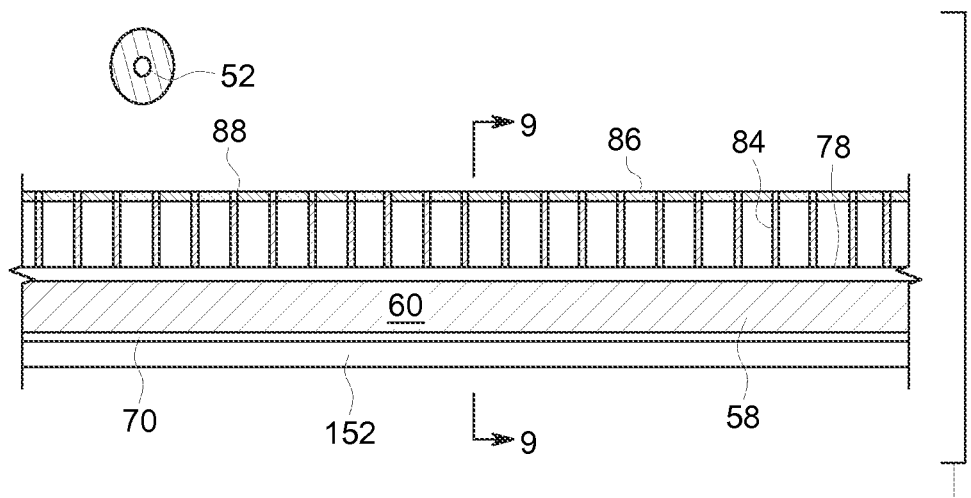
FIG. 8 is a partial cross-sectional view of another embodiment of the variable geometry heat exchanger apparatus, during a first state of operation, in accordance with one or more embodiments shown or described herein.
Figure 9:
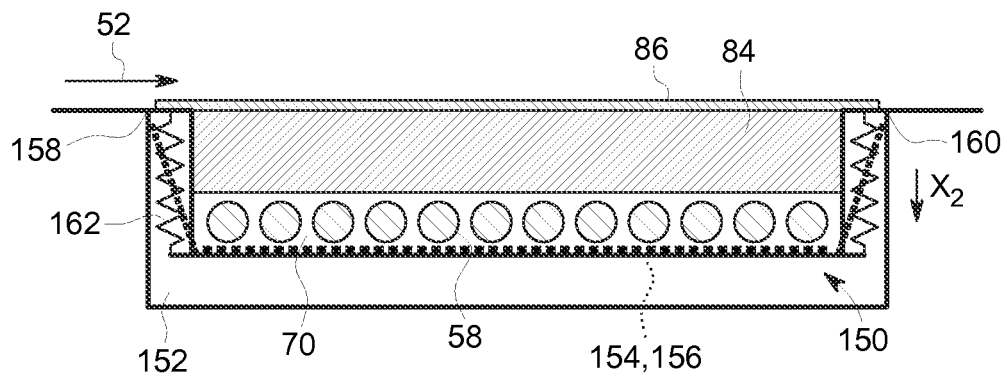
FIG. 9 is a cross-sectional view of the variable geometry heat exchanger apparatus shown in FIG. 8, taken through line 9-9, during the first state of operation, in accordance with one or more embodiments shown or described herein.
Figure 10:
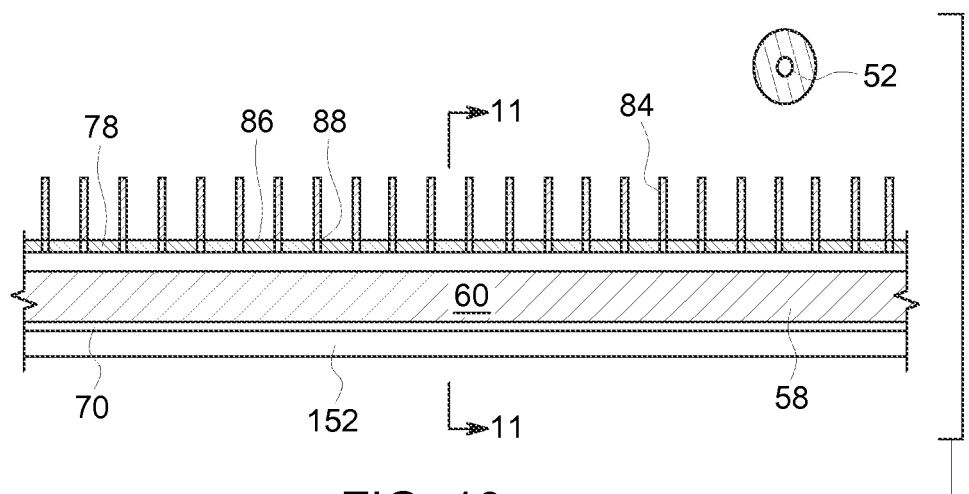
FIG. 10 is a partial cross-sectional view of yet another embodiment of the variable geometry heat exchanger apparatus, during a second state of operation, in accordance with one or more embodiments shown or described herein.
Figure 11:
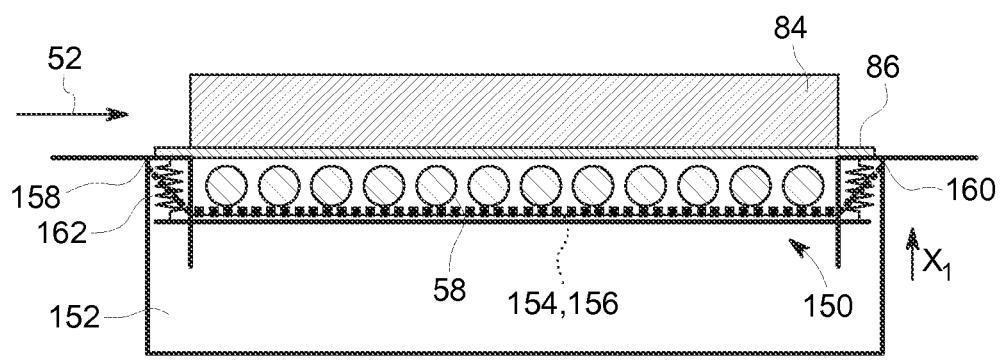
FIG. 11 is a cross-sectional view of the variable geometry heat exchanger apparatus shown in FIG. 10, taken through line 11-11, during the second state of operation, in accordance with one or more embodiments shown or described herein.

Referring now to FIGS. 8-11, illustrated is a second embodiment of the passive automatic retraction and extension system, generally referenced 150, as indication of another embodiment that may be incorporated into the heat exchanger apparatus 54 of FIGS. 1-3. Illustrated in FIGS. 8 and 9 are partial cross-sectional views of the heat exchanger apparatus 54 during a first state of operation, such as when a lesser degree of heat exchange is required, with FIG. 8 taken in a direction generally similar to FIG. 4 and FIG. 9 taken through line 9-9 of FIG. 8. FIGS. 10 and 11 are partial cross-sectional views of the heat exchanger apparatus 54 during a second state of operation, such as when an increase in heat exchange is required, with FIG. 6 taken in a direction generally similar to FIG. 6 and FIG. 11 taken through line 11-11 of FIG. 10. Referring more specifically to FIGS. 8 and 9, illustrated is the heat exchanger apparatus 54 during the first state of operation in which the plurality of fins 84 are positioned in a retracted state. In the illustrated embodiment, the passive automatic retraction and extension system 150 includes a plate 86 having a plurality of opening 88 defined therein. The plate 86 and openings 88 are configured to provide for the passage therethrough of the plurality of fins 84 during extension of the fins, as best illustrated in FIGS. 10 and 11 during the second state of operation. In an embodiment, plate 86 is formed generally similar to previously described with regard to FIGS. 4-7, with each of the plurality of fins 84 is positioned to cooperate and extend through a single opening or slot 88. Additionally, illustrated are the plurality of fluid flow channels 58 having a lubricating fluid, such as heat transfer fluid 60, passing therethrough. In an embodiment, the plate 86 is supported by a housing 152, generally similar to FIGS. 4-7 and into which the surface cooler 56 is disposed.

In the embodiment of the heat exchanger apparatus 54, and more particularly the passive automatic retraction and extension system 150 disclosed in FIGS. 8-11, the system provides extension and retraction of the plurality of fins 84 in response to a temperature of the plurality of fluid channels 84. In this particular embodiment, the passive automatic retraction and extension system 150 includes a thermal actuation component 154, such as a SMA wire 156, generally similar to the embodiment of FIGS. 4-7. In contrast to the previous embodiment, in this particular embodiment the plate 86 remains stationary and the surface cooler 56 and/or a portion of the housing 152 is moved in directions "$x_1$" and "$x_2$" to provide retraction and extension of the plurality of fins 84 via the plate 86.

As previously described, in the illustrated embodiment, the thermal actuation component 104, and more particularly the wire 156, is comprised of a shape memory alloy (SMA) material and thus passively actuated in response to the temperature of the heat transfer fluid 60 and/or the cooling fluid flow 52. The wire 156 is coupled at a first end 158 and a second end 160 to the housing 152 and extends below the surface cooler 56 and/or a portion of the housing 152. During passive actuation, the wire 156 in response to temperature changes of the heat transfer fluid 60 and/or the cooling fluid flow 52, lengthens or shortens, thereby moving the surface cooler 56 and/or a portion of the housing 152 closer to (FIGS. 10 and 11) or further from (FIGS. 8 and 9) the housing 152 and exposing more or less of the plurality of fins 84 through the plurality of slots 88 formed in the plate 86. In an embodiment, one or more extension springs 162 or other similar component capable of exerting a force, are provided to position the surface cooler 56 and/or a portion of the housing 152 to a first position, as illustrated in FIG. 9, when the SMA wire 156 is in a lengthened condition, such as during in-flight conditions where extension of the plurality of fins 84 is not required, due to limited need for heat exchange and/or cooling of the fluid 60.

Figure 12:
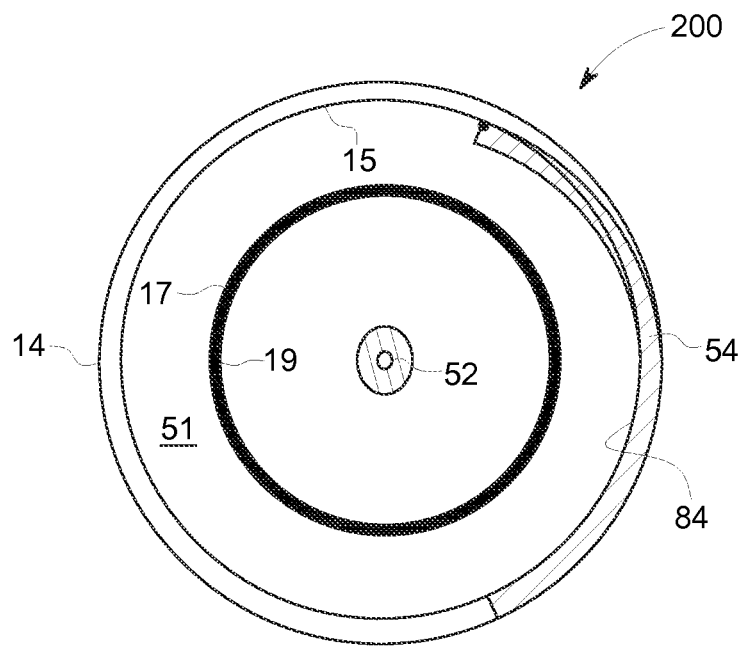
FIG. 12 is a cross-sectional end view of yet another embodiment of a variable geometry heat exchanger apparatus during a first state of operation, in accordance with one or more embodiments shown or described herein.
Figure 13:
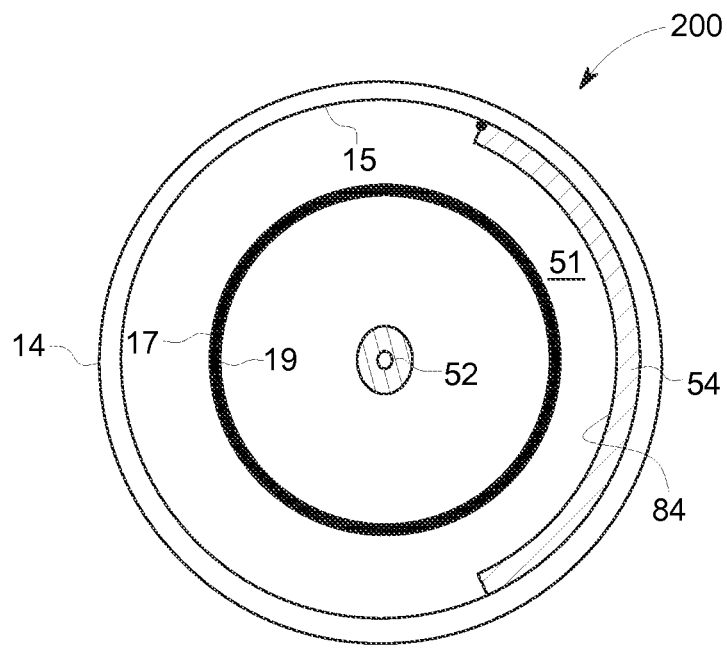
FIG. 13 is a cross-sectional end view of yet another embodiment of the variable geometry heat exchanger apparatus during a second state of operation, in accordance with one or more embodiments shown or described herein.

Referring now to FIGS. 12-17, disclosed are additional embodiments of the heat exchanger apparatus 54, including a passive automatic retraction and extension system. Referring more specifically to FIGS. 12 and 13, illustrated in schematic end cross-sectional views are the fan casing 14 and booster casing 19, having defined therebetween the fan duct 51, as detailed in FIG. 1. A heat exchanger apparatus, generally similar to the heat exchanger apparatus of FIGS. 1-3, and referenced 54, including a surface cooler 56 and a passive automatic retraction and extension system 200 are disposed on the inner wall 15 of the fan casing 14. In contrast to the previously disclosed embodiments, the passive automatic retraction and extension system 200 is rotatably coupled to the fan casing 14. FIG. 12, illustrates the heat exchanger apparatus 54, including the passive automatic retraction and extension system 200 in a first state of operation, such as when a lesser degree of heat exchange is required, wherein the plurality of fins 84 are retracted, such as into the fan casing 14, so as to provide less drag to the engine 10 (FIG. 1). FIG. 13 illustrates the heat exchanger apparatus 54 including the passive automatic retraction and extension system 200 in a second state of operation, such as when an increase in heat exchange is required, wherein the plurality of fins 84 are extended so as to provide for a high degree of cooling and/or heat exchange. As illustrated, during operation, the plurality of fins 84 are configured to extend and retract in response to movement of the surface cooler 56 about a rotatable component (described presently).

Figure 14:
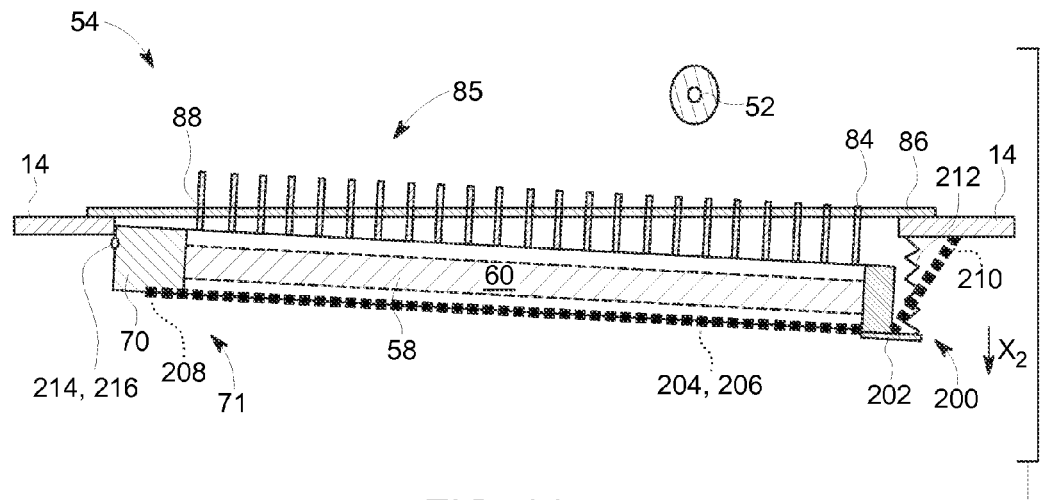
FIG. 14 is a cross-sectional view of the variable geometry heat exchanger apparatus shown in FIG. 12, during the first state of operation, in accordance with one or more embodiments shown or described herein.
Figure 15:
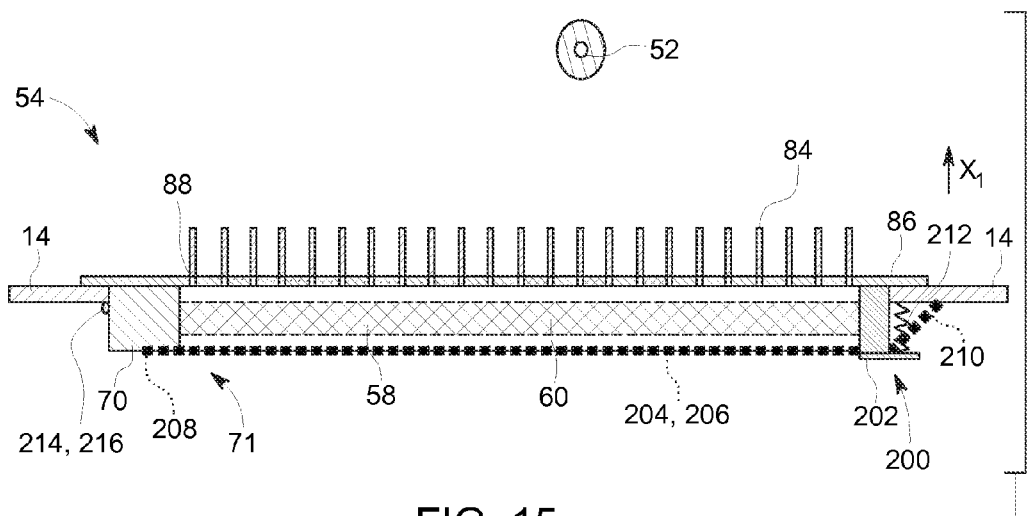
FIG. 15 is a cross-sectional view of the variable geometry heat exchanger apparatus shown in FIG. 13, during the second state of operation, in accordance with one or more embodiments shown or described herein.

Referring now to FIGS. 14 and 15, illustrated in greater detail is the passive automatic retraction and extension system 200 of FIGS. 12 and 13. More specifically, illustrated in FIG. 14 is a partial cross-sectional view of the heat exchanger apparatus 54 including the passive automatic retraction and extension system 200 during a first state of operation, such as when a lesser degree of heat exchange is required. FIG. 15 is a partial cross-sectional view of the heat exchanger apparatus 54 including the passive automatic retraction and extension system 200 during a second state of operation, such as when an increase in heat exchange is required. It should be noted that while the plate 86 is shown as generally planer in FIGS. 14 and 15, its shape is actually a conformal curvilinear arc that may be formed in the shape of the inner wall of the fan casing 14, as best illustrated in FIGS. 12 and 13.

FIGS. 14 and 15 are taken in a direction generally similar to FIG. 4 with the cooling fluid flow 52 going into and out of the page as indicated as such throughout the Figures. Referring more specifically to FIG. 14, illustrated is the heat exchanger apparatus 54 including the passive automatic retraction and extension system 200 during a first state of operation in which the plurality of fins 84 are positioned in a retracted state. In the illustrated embodiment, the heat exchanger apparatus 54 includes a plate 86 having a plurality of openings 88 defined therein. The plate 86 and openings 88 are configured to provide for the passage therethrough of the plurality of fins 84 during extension of the plurality of fins 84, as best illustrated in FIG. 15 during the second state of operation. In an embodiment, plate 86 is formed generally similar to the plate 86 previously described with regard to FIGS. 4-7, with each of the plurality of fins 84 positioned to cooperate and extend through a single opening or slot 88. In an embodiment, the plate 86 is supported by a housing 202, such as fan casing 14. The heat exchanger apparatus 54 is disposed within the housing 202, such as a portion of the fan casing 14 or the like. Additionally, illustrated is a single fluid channel 58 of the plurality of fluid flow channels 58 having a lubricating fluid, such as the heat transfer fluid 60, passing therethrough.

In the embodiment of the heat exchanger apparatus 54 including the passive automatic retraction and extension system 200 illustrated in FIGS. 14-17, the system 200 provides extension and retraction of the plurality of fins 84 in response to a temperature of the fluid 60 in the one or more fluid channels 84 and/or cooling fluid flow 52. In this particular embodiment, the passive automatic retraction and extension system 200 includes a thermal actuation component 204, such as a SMA wire 206, generally similar to the wire 106, 156 in the embodiments of FIGS. 4-7. In an embodiment, the wire 206 is coupled at a first end 208 to the manifold 70 and at a second end 210 to the housing 202 so as to extend below the manifold 70 and/or a portion of the housing 202.

In contrast to the previous embodiments, in this particular embodiment the plate 86 remains stationary and the manifold 70 and/or a portion of the housing 202 in which the surface cooler 56 is disposed is moved about a rotatable component 214 in directions "$x_1$" and "$x_2$" to provide retraction and extension of the plurality of fins 84 via the plate 86. In an embodiment the heat exchanger apparatus 54 is coupled to the fan casing 14, or the like, via the rotatable component 214, which in the illustrated embodiment is a rotatable hinge 216. The rotatable component 214, and more specifically the rotatable hinge 214, is provided to permit rotational movement thereabout of the surface cooler 56 in response to changes in thermal properties of the fluid 60 within the plurality of channels 58.

As previously described with regard to the embodiments of FIGS. 4-11, the wire 206 is comprised of a shape memory alloy (SMA) material and thus passively actuated in response to oil and air temperature. During passive actuation, the wire 206 in response to temperature changes of the cooling flow 52 and the heat transfer fluid 60 within channels 58, lengthens or shortens, thereby rotatably moving an end portion 71 of the surface cooler 56 and/or a portion of the housing 202 about the rotatable component 214 so as to move the surface cooler 56 closer to or further from the plate 86 and exposing more or less of the plurality of fins 84. In addition, provided are one or more extension springs 212 or other similar means, to provide movement of the surface cooler 56 and/or a portion of the housing 202 to a first position, as illustrated in FIG. 14, when the SMA wire 206 is in a lengthened condition, such as during in-flight conditions where extension of the plurality of fins 84 is not required, due to limited need for heat exchange and/or cooling of the fluid 60. Upon heating of the SMA wire 206 in response to thermal conditions present in the cooling flow 52 and/or the heat transfer fluid 60, the SMA wire 206 returns to a memorized shape, and in particular, a shortened length, so as to provide for extension of the plurality of fins 84 through the plate 86 and provide maximum heat exchange or cooling.

As best illustrated in FIGS. 14 and 15, in an embodiment, the plurality of fins 84 may be configured of a substantially single height, thereby providing for a portion of the fins 85 at an end proximate the rotatable component 214 to remain partially extended into the cooling fluid flow 52, as best illustrated in FIG. 14, when the plurality of fins 84 are positioned in the first state of operation, or in the retracted position.

Figure 16:
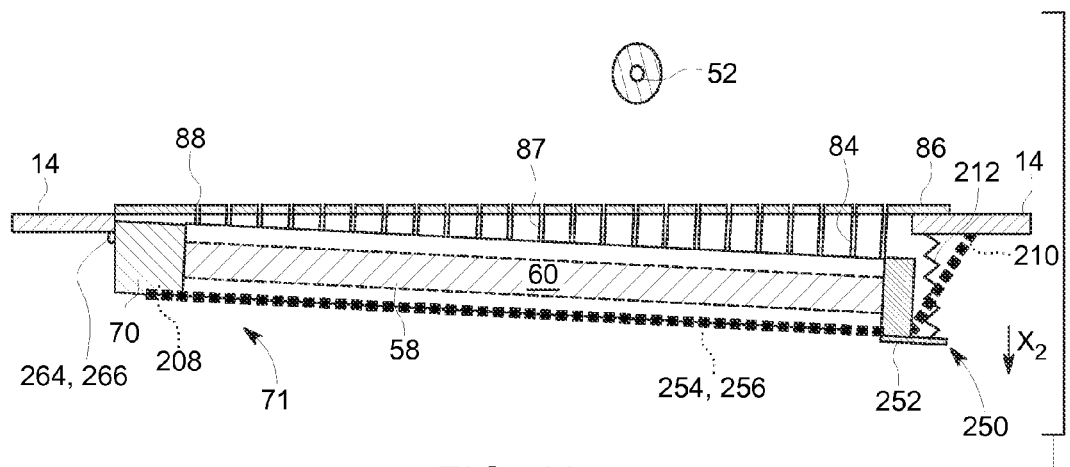
FIG. 16 is a cross-sectional view of yet another embodiment of a variable geometry heat exchanger apparatus during a first state of operation, in accordance with one or more embodiments shown or described herein.
Figure 17:
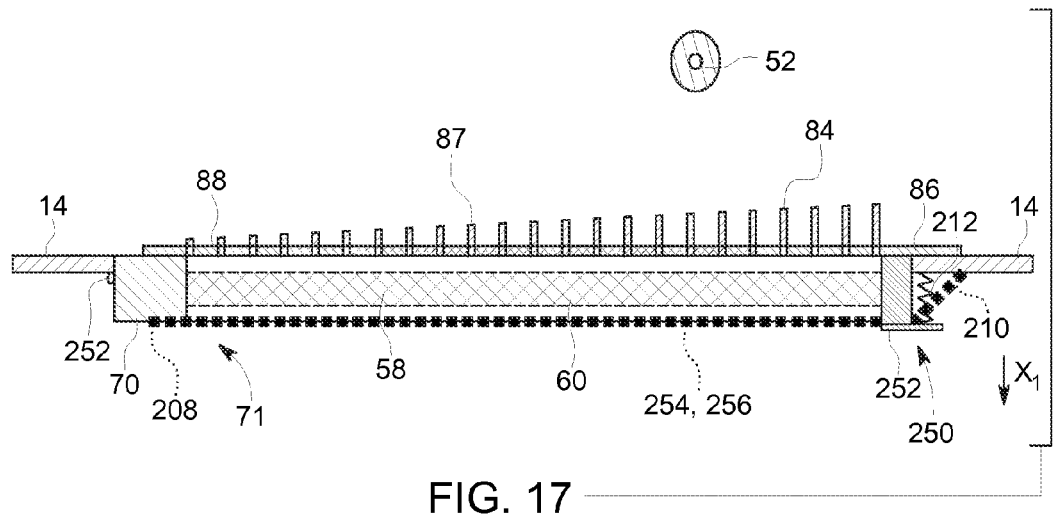
FIG. 17 is a cross-sectional view of the variable geometry heat exchanger apparatus shown in FIG. 16, during a second state of operation, in accordance with one or more embodiments shown or described herein.

Illustrated in FIGS. 16 and 17, is and embodiment of the heat exchanger apparatus 54 including a passive automatic retraction and extension system 250, generally similar to the embodiment of FIGS. 14 and 15. The passive automatic retraction and extension system 250 includes a housing 252, a thermal actuation component 254, such as a SMA wire 256, having a first end 258 and a second end 260, one or more extension springs 262, and a rotatable component 264, such as a rotatable hinge 266, all configured in generally the same manner as the embodiment illustrated and described in FIGS. 14 and 15. In this particular embodiment, the plurality of fins 84 may be configured of graduated heights, thereby providing for a plurality of graduated fins 87 to fully retract out of the cooling fluid flow 52, as best illustrated in FIG. 16, when the plurality of graduated fins 87 are positioned in the first state of operation, or in the retracted position.

It is anticipated by this disclosure, that any variation of alternative spacing and/or number of the plurality of fins 84, cooperative openings 88 in the plate 86 and the flow through channels 58 may be incorporated into the heat exchanger apparatus 54 depending on amount of cooling required by the heat exchanger apparatus 54 and that the embodiments of FIGS. 4-17 are merely exemplary in nature.

In one embodiment, the manifold portion 70 is formed utilizing an extrusion process. An integral channel forming means is incorporated in the extrusion process. Next, an integral fin forming process, for example, is then conducted to form the cooling fins 84. Optionally, the cooling fins 84 may be attached to manifold portion 70 utilizing a welding or brazing procedure, for example. In the exemplary embodiment, the manifold portion 70, defining the at least one flow through channel 58 and the cooling fins 84 are fabricated from a metallic material such as aluminum, for example. In another embodiment, the upstream-to-downstream width of the manifold 70 may be assembled from several narrower extrusions each containing a subset of the plurality of flow through channels 58 and a subset of the plurality of fins 84. These sections may be connected by welding, brazing, interlocking or other mechanical attachment.

To facilitate channeling the heat transfer fluid 60 to be cooled through the manifold portion 70, the heat exchanger apparatus 54 also includes at least one inlet connection 110 (FIG. 3), each coupled to the manifold portion first end 72 and at least one outlet connection 112 (FIG. 3), each coupled to the manifold portion second end 74. In the exemplary embodiment, the at least one inlet connection 110 may be coupled downstream from a valve (not shown) and the at least one outlet connection 112 may be coupled upstream from a valve (now shown) such that the valves may be operated to channel the heat transfer fluid 60 through heat exchanger apparatus 54 during desired operating conditions. Optionally, a bypass valve (not shown) may be utilized to bypass the heat transfer fluid 60 around heat exchanger apparatus 54. In an alternate embodiment, the heat exchanger can be configured to have a plurality of fluid circuits, each with an inlet connection and an outlet connection. These circuits can each have a separate and distinct purpose and carry non-mixing fluids, which are used for cooling different apparatus.

To facilitate securing the heat exchanger apparatus 54 to the gas turbine engine assembly 10, the manifold portion 90 may include a plurality of attachment portions. Further teaching with regard to the attachment of a heat exchanger to a gas turbine engine assembly can be found, for example, in copending U.S. Patent Publication No. 2008/0095611, which is incorporated herein by reference.

During typical operating temperatures, the heat transfer fluid 60, and more particularly the hot fluid 62, is channeled from the gas turbine engine 10 through the plurality flow through channels 58 of the heat exchanger apparatus 54 and discharged from the heat exchanger apparatus 54 at a substantially cooler temperature. Specifically, the heat transfer fluid 60 is channeled in a substantially circumferential orientation within or around the gas turbine engine 10 and within the flow through channels 58. Simultaneously, the cooling fluid flow 52 supplied into or around the fan intake 49 is channeled through the plurality of cooling fins 84 to facilitate reducing an operational temperature of the heat transfer fluid 60 channeled through the heat exchanger apparatus 54.

For example, during operation the relatively hot fluid 62 is channeled through the plurality of flow through channels 58 wherein the relatively hot fluid transfers its heat to a conductive surface, i.e. the radially inner surface 76 of manifold 70 and thus cooling fins 84. The relatively cooler cooling fluid flow 52 passing through or around the fan intake 49 is channeled across and/or through cooling fins 84 wherein the heat is transferred from cooling fins 84 to the cooling fluid flow 52 through the bypass duct 51. As such, the cooling fluid flow 52 channeled into the fan intake 49 facilitates reducing a temperature of the cooling fins 84, thus reducing a temperature of the heat exchanger apparatus 54 and therefore a temperature of the heat transfer fluid 60 channeled through manifold portion 70 and the flow through channels 58.

As previously indicated, over the course of varying flight conditions, operation of the heat exchanger apparatus 54, and more specifically, the configuration of the plurality of cooling fins 84 (extended or retracted) depends on the temperature of the fluid flow channels 58 in the heat exchanger apparatus 54, which is driven by the heat transfer fluid 60 temperature and the cooling fluid flow 52 temperature. When the heat transfer fluid 60 temperature is higher, due to a higher heat duty of the heat exchanger 54, the passive automatic retraction and extension system 100, 150, 200, 250, as disclosed herein will be in an actuated position so as to extend the plurality of fins 84 into the cooling fluid flow 52. When the heat exchanger 54 has successfully decreased the heat transfer fluid 60 temperature, the passive automatic retraction and extension system 100, 150, 200, 250 will be actuated to position the surface cooler 56 so as to retract the plurality of fins 84 out of the cooling fluid flow 52, thereby decreasing aerodynamic drag and the engine specific fuel consumption. During ground idle, take off or climb conditions, the temperature of the heat transfer fluid 60 flowing within the fluid flow channels 58 will be higher than the transition temperature of the thermal actuation component 104, 154, 204, 254, thus actuating an extension of the plurality of cooling fins 84 into the cooling fluid flow 52. During the first state of operation the temperature of the heat transfer fluid 60 flowing within the fluid flow channels 58 decreases to a temperature lower than the transition temperature of the thermal actuation component 104, 154, 204, 254, thus actuating a retraction of the plurality of cooling fins 84 out of the cooling fluid flow 52 to decrease the aerodynamic drag.

Accordingly disclosed is a novel variable geometry heat exchanger apparatus including a passive automatic retraction and extension system. The geometry of the heat exchanger apparatus self-adapts to the flight cycle. More particularly, the apparatus provides for the passive change of the surface cooler location based on the thermal boundary conditions/properties to adapt the heat exchanger to the engine operating conditions or flight conditions. The heat exchanger is optimized during all the flight envelopes considering the oil temperature, air temperature and air speed. The disclosed concept has several advantages. Among them, the novel heat exchanger apparatus, including the passive automatic retraction and extension system, is inexpensive to manufacture, reliable, operates in a passive mode, thus does not require an external source of energy and provides less aerodynamic drag than prior art heat exchange apparatus, resulting in a savings in engine specific fuel consumption.

The foregoing has described a variable geometry heat exchanger apparatus for a gas turbine engine and a method for its operation. While the present disclosure has been described with respect to a limited number of embodiments, those skilled in the art, having benefit of this disclosure, will appreciate that other embodiments may be devised which do not depart from the scope of the disclosure as described herein. While the present disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the present disclosure without departing from the essential scope thereof. For example, the variable geometry heat exchanger apparatus described herein may be configured for use in many different types of aircraft engine architectures, in addition to the example engine describe herein, such as, but not limited to a multi-spool design (additional compressor and turbine section), a geared turbo fan type architecture, engines including un-ducted fans, single shaft engine designs (single compressor and turbine sections), or the like. In addition, the variable geometry heat exchanger apparatus disclosed herein will work equally well with other types of fluid cooled heat exchanger apparatus, and as such is not intended to be limited to surface coolers, and may be configured for use in other types of surface coolers, such as plate and fin, channel-fin type, or the like would benefit as well. Therefore, it is intended that the present disclosure not be limited to the particular embodiment disclosed as the best mode contemplated for carrying out the disclosure. It is, therefore, to be understood that the appended claims are intended to cover all such modifications and changes as fall within the true spirit of the disclosure.

What is claimed is:

1. A heat exchanger apparatus comprising:
  a surface cooler having disposed therein one or more fluid flow channels configured for a passage therethrough of a heat transfer fluid to be cooled, the heat transfer fluid in a heat transfer relation on an interior side of said one or more fluid flow channels, the surface cooler including a plurality of fins projecting from an outer surface thereof;
  wherein the surface cooler is disposed in a housing; and
  a passive automatic retraction and extension system coupled to the surface cooler, the passive automatic retraction and extension system comprising:
    a thermal actuation component comprised of a shape memory alloy, wherein the shape memory alloy senses a temperature of at least one of the heat transfer fluid and a cooling fluid flow and actuates a change in a geometry of the surface cooler in response to a first sensed change in the temperature of the at least one of the heat transfer fluid and the cooling fluid flow; and
    a plate including a plurality of openings formed therein, the plate configured to overlay the surface cooler, the plate further configured to provide for a passive, automatic extension of the plurality of fins through the plurality of openings in response to a thermal condition in order to maximize heat transfer capability, and the plate further configured to provide a passive, automatic retraction of the plurality of fins through the plurality of openings in response to a second change in the thermal condition in order to decrease aerodynamic drag of the plurality of fins.

2. The heat exchanger apparatus of claim 1, wherein the thermal actuation component is a shape memory alloy wire.

3. The heat exchanger apparatus of claim 1, wherein the thermal actuation component provides the passive, automatic retraction of the plurality of fins away from the cooling fluid flow during a first state of operation and the passive, automatic extension of the plurality of fins into the cooling fluid flow during a second state of operation.

4. The heat exchanger apparatus of claim 3, wherein the first state of operation is a cruise condition and wherein the second state of operation is at least one of a ground idle condition and a climb condition.

5. The heat exchanger apparatus of claim 1, wherein the thermal actuation component is coupled to the plate at a first end and to the housing at an opposed second end, the thermal actuation component configured to move the plate relative to the surface cooler to provide for the plurality of fins to be positioned within the cooling fluid flow or retracted from the cooling fluid flow.

6. The heat exchanger apparatus of claim 1, wherein the thermal actuation component is coupled to the housing at a first end and an opposed second end, the thermal actuation component configured to move the surface cooler relative to the plate.

7. The heat exchanger apparatus of claim 1, wherein the surface cooler is rotatably mounted to the housing at an end portion and the thermal actuation component is coupled to the surface cooler at a first end and to the housing at an opposed second end, the thermal actuation component configured to rotatably move the surface cooler relative to the plate.

8. The heat exchanger apparatus of claim 1, wherein the heat exchanger apparatus is configured for use in an aerospace application.

9. The heat exchanger apparatus of claim 8, wherein the heat exchanger apparatus is configured for use in an oil cooling system of an aircraft engine.

10. A heat exchanger apparatus for use in an oil cooling system of an aircraft engine comprising:
a surface cooler;
wherein the surface cooler is disposed in a housing;
the surface cooler comprising:
a manifold portion including a radially inner surface and a radially outer surface, an upstream wall and an opposite downstream wall;
one or more flow through channels in fluid communication with the manifold portion and extending through the manifold portion, the one or more flow through channels having contained therein a heat transfer fluid; and
a plurality of cooling fins formed unitarily with the manifold portion, projecting from an outer surface thereof and positioned perpendicular to the one or more flow through channels; and
a passive automatic retraction and extension system coupled to the surface cooler, the passive automatic retraction and extension system comprising a thermal actuation component comprised of a shape memory alloy and a plate including a plurality of openings formed therein and overlying the surface cooler, wherein the shape memory alloy senses a temperature of at least one of the heat transfer fluid and a cooling fluid flow and actuates a change in a geometry of the surface cooler in response to a sensed change in the temperature of the at least one of the heat transfer fluid and the cooling fluid flow, so that the shape memory alloy provides a passive, automatic retraction of the plurality of fins through the plurality of openings in the plate and out of the cooling fluid flow during a first state of operation and provides a passive, automatic extension of the plurality of fins through the plurality of openings in the plate and into the cooling fluid flow during a second state of operation.

11. The heat exchanger apparatus of claim 10, wherein the heat exchanger apparatus has a first circumferential profile and a first axial profile that conforms to a second circumferential profile and a second axial profile of a fan duct at a location within the fan duct where the heat exchanger apparatus is mounted.

12. The heat exchanger apparatus of claim 10, wherein the first state of operation is a cruise condition and the second state of operation is at least one of a ground idle condition and a climb condition.

13. The heat exchanger apparatus of claim 10, wherein the thermal actuation component is a shape memory alloy wire.

14. The heat exchanger apparatus of claim 10, wherein the thermal actuation component is configured to move the plate relative to the surface cooler or the surface cooler relative to the plate to provide for the plurality of fins to be positioned within the cooling fluid flow or retracted from the cooling fluid flow.

15. An engine comprising:
a fan assembly;
a core engine downstream of the fan assembly;
a fan casing circumscribing the fan assembly;
a booster casing circumscribing the core engine such that a bypass duct is defined between the fan casing and the booster casing; and
an arcuate heat exchanger apparatus coupled to one of the fan casing and the booster casing, the arcuate heat exchanger comprising:
a surface cooler having disposed therein one or more fluid flow channels configured for a passage therethrough of a heat transfer fluid to be cooled, the heat transfer fluid in a heat transfer relation on an inner side of said one or more fluid flow channels, the surface cooler including a plurality of fins projecting from an outer surface thereof;
wherein the surface cooler is disposed within a housing; and
a passive automatic retraction and extension system coupled to the surface cooler, the passive automatic retraction and extension system comprising:
a thermal actuation component comprised of a shape memory alloy and a plate including a plurality of openings formed therein and overlying the surface cooler, wherein the shape memory alloy senses a temperature of at least one of the heat transfer fluid and a cooling fluid flow and actuates a change in a geometry of the surface cooler in response to a first, sensed change in temperature of the at least one of the heat transfer fluid and the cooling fluid flow to provide a passive, automatic retraction of the plurality of fins through the plurality of openings in the plate and out of the cooling fluid flow during a first state of operation and to provide a passive, automatic extension of the plurality of fins through the plurality of openings in the plate and into the cooling fluid flow during a second state of operation.

16. The engine of claim 15, wherein the thermal actuation component is a shape memory alloy wire.

* * * * *